(12) United States Patent
Yamanaka

(10) Patent No.: US 8,023,125 B2
(45) Date of Patent: Sep. 20, 2011

(54) IMAGE FORMING APPARATUS HAVING TEMPORARY STORAGE FOR MANAGEMENT INFORMATION

(75) Inventor: Shuichi Yamanaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 843 days.

(21) Appl. No.: 11/468,422

(22) Filed: Aug. 30, 2006

(65) Prior Publication Data

US 2007/0067683 A1 Mar. 22, 2007

(30) Foreign Application Priority Data

Sep. 21, 2005 (JP) .................................. 2005-273435

(51) Int. Cl.
*G06K 15/00* (2006.01)
(52) U.S. Cl. .......................... 358/1.14; 358/1.1; 714/100
(58) Field of Classification Search .................... 358/1.1, 358/1.14; 714/100
See application file for complete search history.

(56) References Cited

U.S. PATENT DOCUMENTS

| | | | | |
|---|---|---|---|---|
| 4,600,319 A | * | 7/1986 | Everett, Jr. ....................... 400/54 |
| 5,023,862 A | * | 6/1991 | Kim ............................... 720/673 |
| 5,935,262 A | * | 8/1999 | Barrett et al. .................... 714/46 |
| 2001/0012260 A1 | * | 8/2001 | Tamiya et al. ................. 369/192 |
| 2002/0181008 A1 | * | 12/2002 | Nozaki .......................... 358/1.14 |

FOREIGN PATENT DOCUMENTS

| | | |
|---|---|---|
| JP | 2001202728 A | 7/2001 |
| JP | 2002062763 A | 2/2002 |
| JP | 2005-088554 A | 4/2005 |

OTHER PUBLICATIONS

Hashimoto et al, Image Forming Apparatus, Control Method Therefor and Recording Medium, Feb. 28, 2002, JP 2002-062763.*
Kimura, Image Forming Apparatus, Jul. 4, 2005, JP 2005-088554.*

* cited by examiner

*Primary Examiner* — Benny Tieu
*Assistant Examiner* — Martin Mushambo
(74) *Attorney, Agent, or Firm* — Panitch Schwarze Belisario & Nadel LLP

(57) ABSTRACT

To remove effects on the access of the hard disk drive apparatus (HDD), caused by the shock at a time where the user pulls out the paper tray, the image forming apparatus of the present invention includes an apparatus error detection unit for detecting the removal and occurrence of errors requiring the intervention of the user, an information storage unit for bringing the pickup unit near the rotating recording medium to record and reproduce information, and a memory control unit for stopping access to the information storage unit from a time where the error is detected by the apparatus error detection unit until a time where removal of the error is detected.

10 Claims, 7 Drawing Sheets

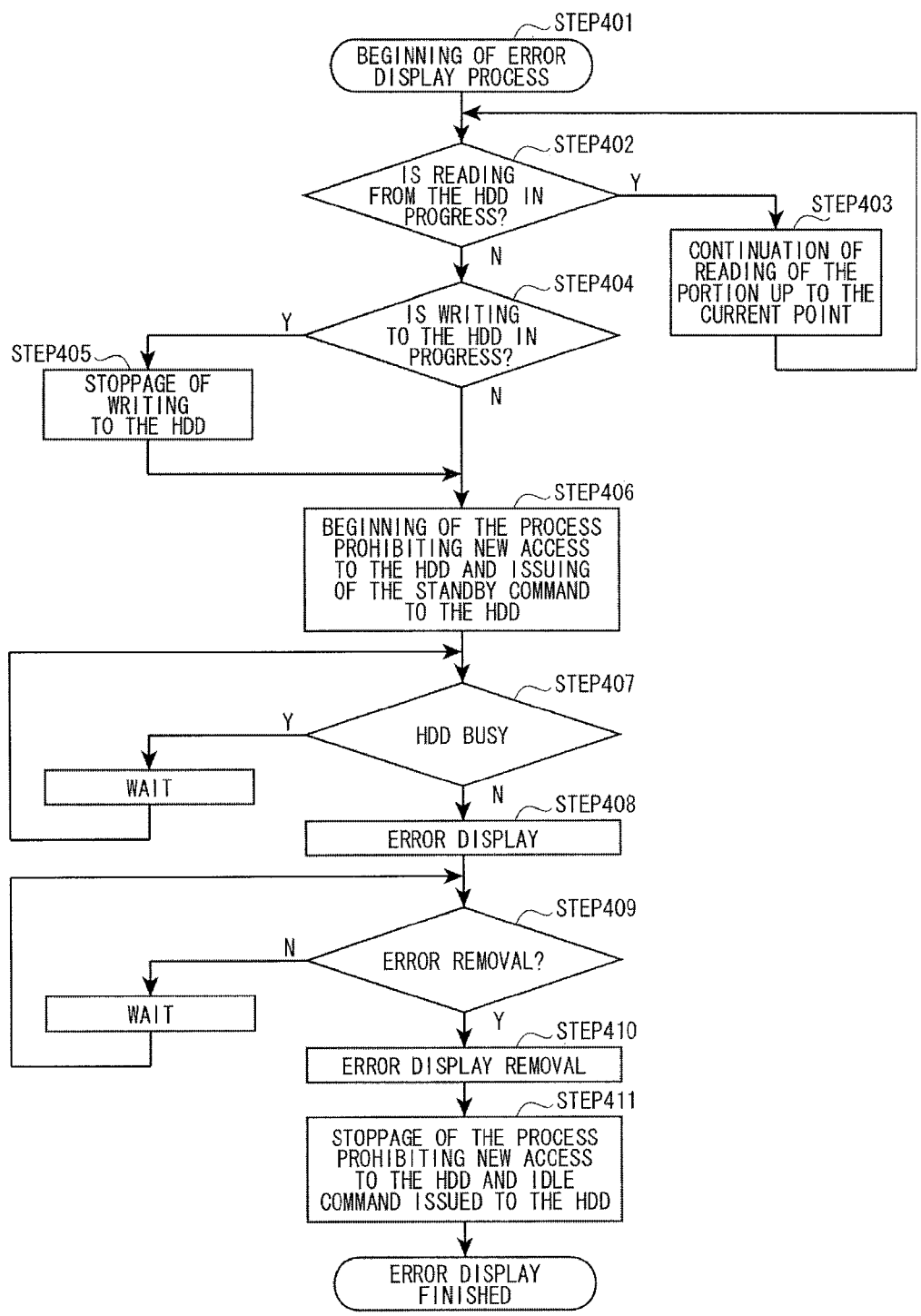

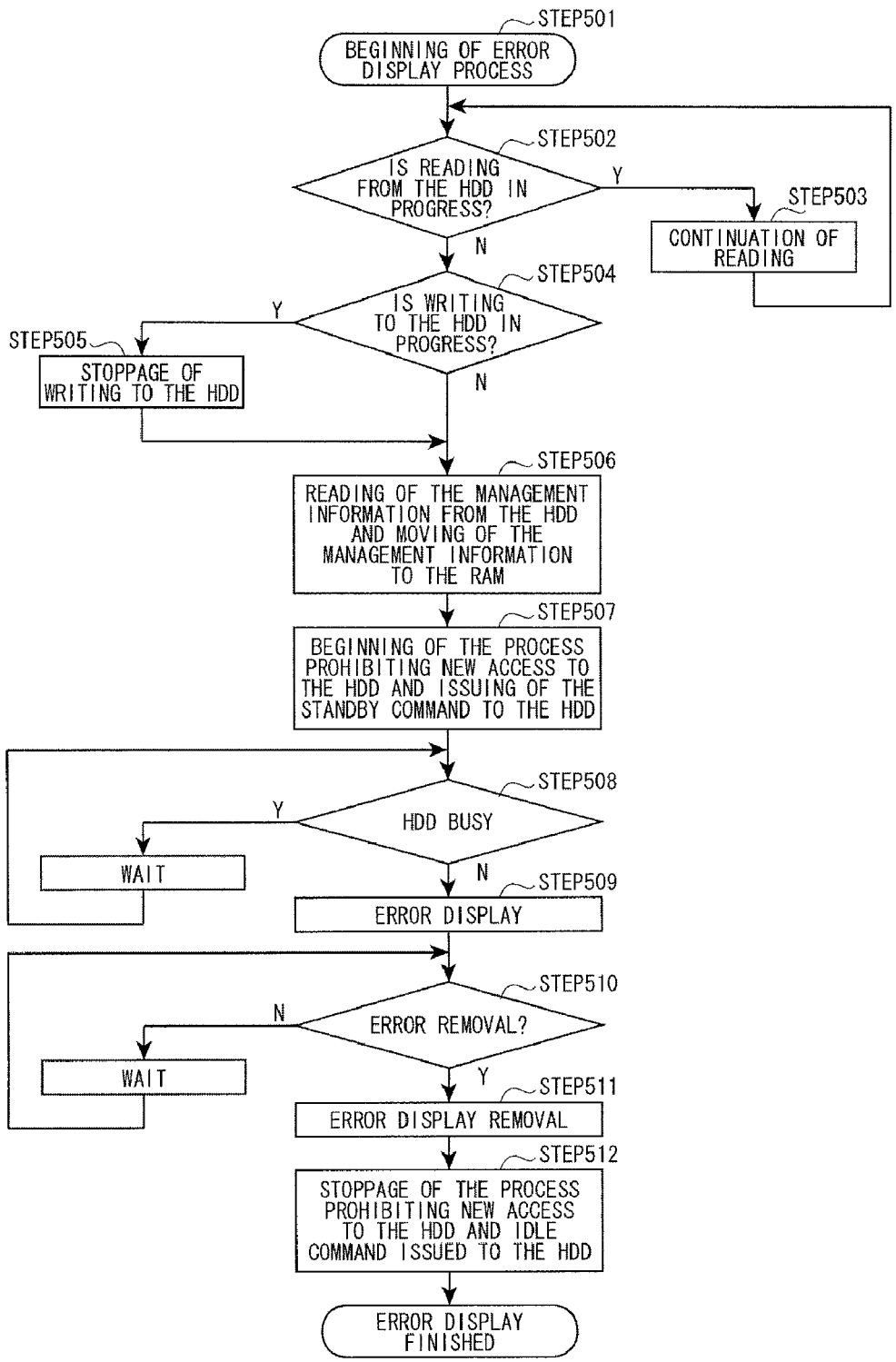

IMAGE FORMING APPARATUS HAVING TEMPORARY STORAGE FOR MANAGEMENT INFORMATION

BACKGROUND OF THE INVENTION

1. Field of the Invention

The present invention relates to an image forming apparatus having an information processing apparatus and particularly, an image forming apparatus, applicable to a printing apparatus, having an information storage apparatus (hard disk drive (HDD)) arranged near the pickup portion to a rotating recording medium for recording and reproducing information.

2. Description of Related Art

In recent years, the image forming apparatus serving as a printing apparatus is connected to a hard disk drive apparatus (HDD) used as an information storage apparatus having a large amount of storage capacity. In this type of image forming apparatus, printing data are created based on data received from a personal computer (PC) or the like, and these printing data are written and stored in a recording medium capable of rotation in a hard disk drive apparatus (HDD) acting as an information storage apparatus. And printing is executed after reading the information already stored in the recording medium (hard disk medium). Other apparatuses store the printing logs in the hard disk medium for every performance of printing and, in a case where an inquiry concerning the stored printing data or the printing log up to this point is made by a host apparatus such as a PC, read the information stored on the hard disk medium and respond to the inquiry of the PC.

In the information storage apparatus (hard disk drive apparatus (HDD)), the pickup unit that reads and writes information on the rotating circular recording medium (hard disk medium) conducts reading and writing by moving from a standby condition at which it is separated from the recording medium to an access condition at which it is near the recording medium.

If the apparatus receives a shock or vibration during the writing process, however, the pickup unit cannot be held in the proper location to access the recording medium and, in a case where the apparatus suffers a violent shock, there is a danger that the pickup unit may come in contact with the rotating recording medium, causing irreparable damages.

To avoid the problem described above, an apparatus is proposed in which movement of the paper tray is detected by a detection section and, while the paper tray is being put in or taken out, reading and writing of information to the information storage apparatus is restricted (see generally, Japanese Application Publication JA2005-88554).

In the conventional image forming apparatus described above, however, access such as reading and writing of information to the information storage apparatus (hard disk drive apparatus (HDD)) can be restricted only after the detection section has actually detected that the paper tray has been removed. There is therefore the problem that the effect on the access of the hard disk drive apparatus (HDD), caused by the shock at a time where the user pulls out the paper tray, cannot be removed.

SUMMARY OF THE INVENTION

The present invention takes the aforementioned problem into consideration and aims to provide an image forming apparatus that can remove the effect on the access of the hard disk drive apparatus (HDD), caused by shock at a time where the user pulls out the paper tray.

To achieve the aforementioned goal, the image forming apparatus of the present invention contains an apparatus error detection unit for detecting occurrence and removal of an error that requires intervention of the user, an information storage unit for bringing the pickup unit near the rotating recording medium to reproduce information records, and an information control unit for stopping access to the information storage unit from a time where the error is detected by the apparatus error detection unit until a time where removal of the error is detected.

The present invention performs in a manner such that access to the information storage unit is stopped from the time where the apparatus error detection unit detects an error until the time where removal of the error is detected.

In the manner described above, the image forming apparatus of the present invention is structured to stop access to the hard disk drive apparatus (HDD) from the time where the apparatus error detection unit detects an error until the time where removal of the error is detected. The present invention therefore achieves the affect of providing an image apparatus that can remove the effect on the access of the information storage device (for example, a hard disk drive apparatus (HDD)), caused by the shock at a time where the user pulls out the paper tray.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 4 is a flow chart showing the error display process of the image forming apparatus of the first embodiment;

FIG. 5 is a flow chart showing the error display process of the image forming apparatus of the second embodiment;

DESCRIPTION OF PREFERRED EMBODIMENTS

First Embodiment

Figure 1:
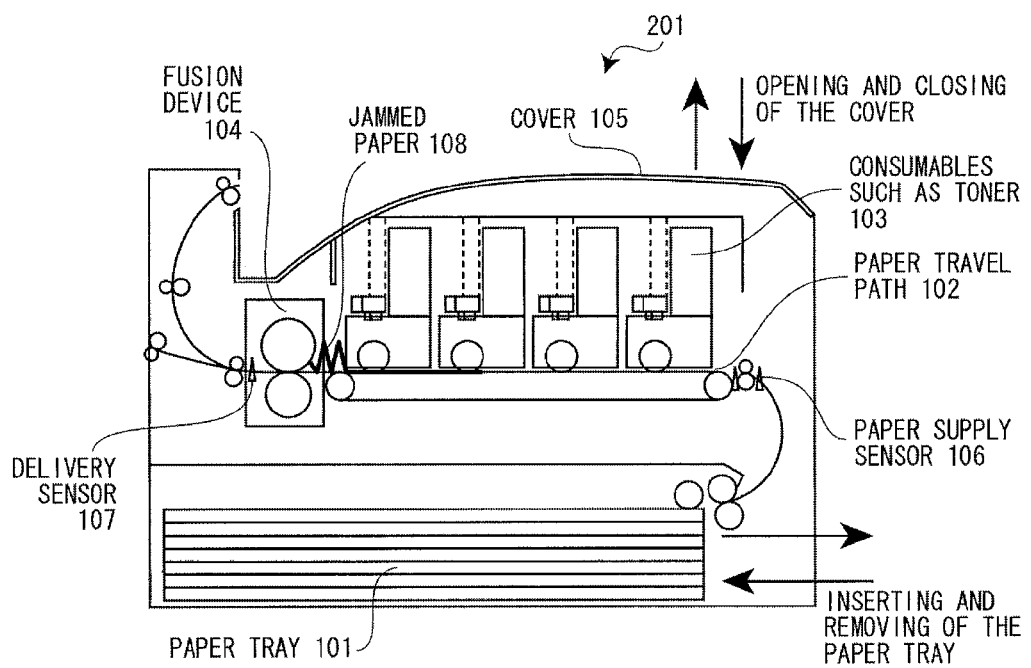
FIG. 1 is a diagram showing the overall structure of the printing apparatus included in the image forming apparatus of the present invention.

The following is a detailed explanation using diagrams concerning the best mode for carrying out the first embodiment of the present invention. FIG. 1 is an explanatory diagram showing the structure of the image forming apparatus of the present invention applicable to a printer 201. 201 represents a printing apparatus, printer, and image forming apparatus.

The image forming apparatus of the present invention contains a paper tray 101 that stores printing paper P that is the object of printing for image data and the like based on a printing job, a paper travel path 102 for feeding the paper while forming the image by the image formation process, and an upper cover 105 that opens and closes to allow access to the inside of the printer 201 to remove a paper jam that occurred during printing or to replenish or replace consumables 103 such as toner or an image drum.

The printing job is data such as image data imported from a PC or information processing apparatus, and is also reception data for printing the image and the like, based on the image data and the like, on the printing medium P such as printing paper after the information is sent.

The image forming apparatus further contains a paper supply sensor 106 and a delivery sensor 107 as sensors to confirm the feeding condition of the printing medium (printing paper) P. The sensors are formed together with a photosensor and a lever, not shown, arranged to block the photosensor during the passage of the paper P, and the sensors perform in a manner to change an output signal to a wave form at the time where the paper P passes each sensor.

Figure 2:
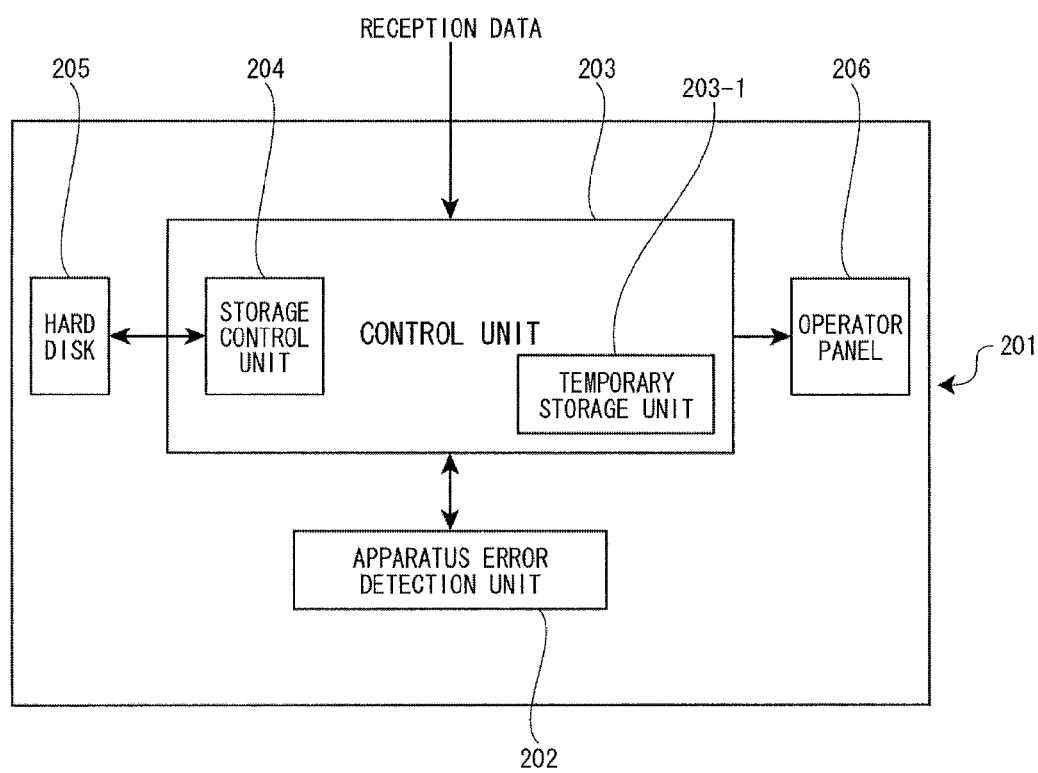
FIG. 2 is an explanatory diagram showing the structure of the information processing apparatus of the image forming apparatus of FIG. 1.

FIG. 2 is a block diagram showing the structure of the control unit area of the printer 201 applicable to the image forming apparatus of the present invention.

The printer 201 contains an apparatus error detection unit 202 for giving notification of an error detection signal caused by the detection of a signal from sensors, not shown, formed with the paper feeding path 102, the paper tray 101, and the detection unit that detects how much of the consumables such as the toner and image drum have been consumed, a control unit 203 that receives the error detection signal along with receiving the printing job as the reception data via a PC or a network, an information storage apparatus 205 such as a hard disk, and an operator panel 206 to be operated by the user.

The control unit 203 is formed by an electric circuit having a temporary storage apparatus 203-1 such as a cache memory, a random access memory (RAM), and a read only memory (ROM) disposed in a central processing unit (CPU) of a computer. The cache memory may be arranged to be housed inside the information storage apparatus 205, explained later, or near the CPU core in the CPU to allow fast performance speed. With this type of structure, the control unit 203 analyzes the reception data received from an external source and creates the printing job. In addition, the control unit 203 houses the storage control unit 204 for storing the performance condition of the printing apparatus (printer), error information, and the like and controls the display of the error information and the like displayed in the operator panel 206.

Figure 3A:
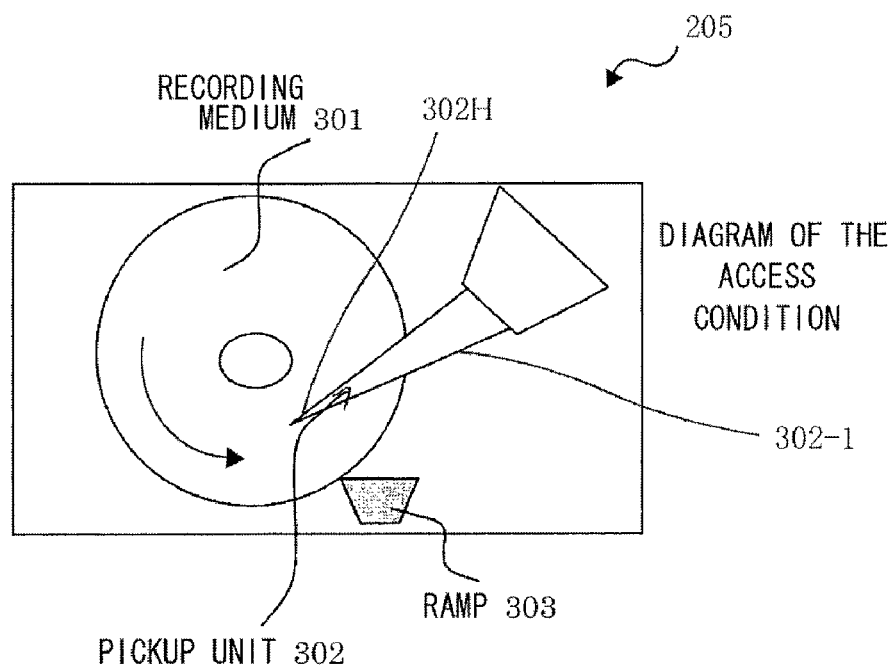
FIG. 3A is a diagram showing the structure of the information storage apparatus (hard disk drive (HDD)) of FIG. 1 in an access condition.
Figure 3B:
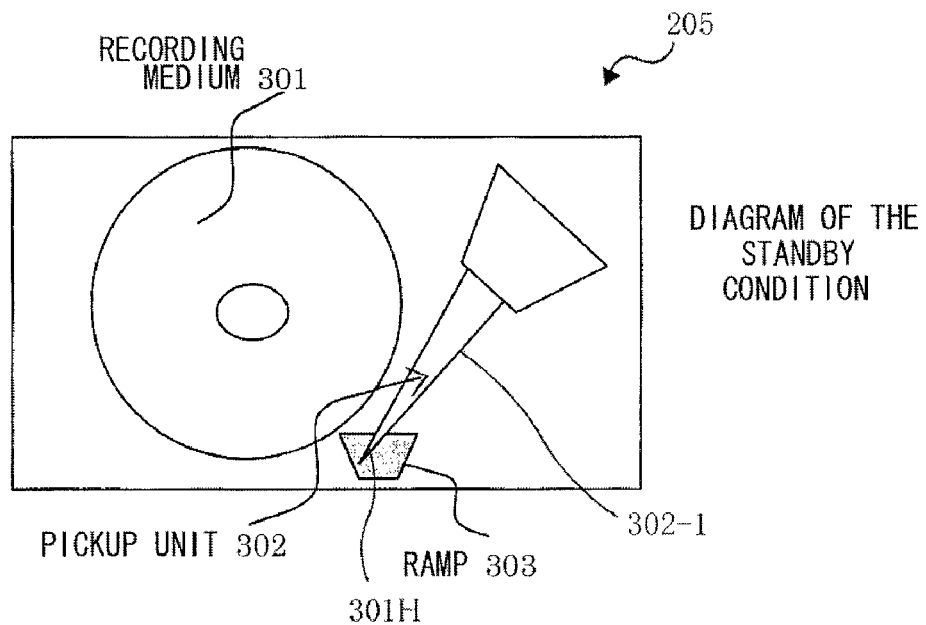
FIG. 3B is a diagram showing the structure of the information storage apparatus (hard disk drive (HDD)) of FIG. 1 in a standby condition.

FIG. 3A and FIG. 3B are schematic diagrams showing the structure of the information storage apparatus 205. As shown in FIG. 3A and FIG. 3B, the information storage apparatus 205 contains a rotating circular recording medium 301 (hard disk medium), a pickup unit 302 (optical pickup) for writing and reading information from the recording medium 301, and a ramp 303 for holding the magnetic head 302H of the tip of the swing arm 302-1 of the pickup unit 302 away from the recording medium 301. In a case where the information storage apparatus 205 houses the hard disk, an ATA (Advanced Technology Attachment) command is supported as an interface standard. In accordance with the instructions of the control unit 203, the storage control unit 204 outputs an access signal to the information storage apparatus 205.

In addition, the storage control unit 204 contains a status register that stores access information concerning the condition of the access signal and the like output to the information storage apparatus 205, and also notifies the operator panel 206 about the access information.

The following is a detailed explanation using FIG. 1 through FIG. 3 concerning the performance of the image forming apparatus of the current embodiment.

First, referencing FIG. 1, the printing paper P held in the paper tray 101 in the printer of the image forming apparatus is driven by a drive train, not shown, and fed to the paper supply sensor 106. In the paper travel path 102, the image formation process is executed using the consumables 103 such as toner. The printing paper P, while having an image formed on the surface by an electrophotographic process, is fed downstream to a fusion device 104.

In the fusion device 104 downstream from the paper travel path 102, the toner image formed on the printing paper P is fused by heat and pressure. The printing paper with the toner image fused by the fusion device 104 is delivered outside the apparatus by a pair of delivery rollers, thereby finishing the image formation process.

Data processing of the printer 201 of the present invention is now explained referencing FIG. 2.

The control unit 203 of the printer 201 receives the reception data from an external terminal via a communication unit, not shown. The control unit 203 analyzes the reception data and generates printing data that can form the toner image. In a case where size of the created printing data is too large to be stored in the temporary storage unit 203-1 such as the RAM or a case where printing data is created that requires authentication and the like and printing cannot be performed immediately after creation, the control unit 203 writes the printing data to the information storage apparatus (hard disk drive apparatus (HDD)) 205 to store the printing data until it is used in the execution of the printing.

Printing is executed while the printing information is again being read from the information storage apparatus (hard disk drive apparatus (HDD)) 205 at a time where printing is actually performed. For every performance of printing executed by the control unit 203, a printing log is stored in the information storage apparatus (hard disk drive apparatus (HDD)) 205 and, in a case where an inquiry is requested by a host apparatus such as a PC concerning the stored printing data or the information of the printing log up to this point, the information stored in the information storage apparatus (hard disk drive apparatus (HDD)) 205 is read and a response is sent to the personal computer PC that originally made the inquiry. Reading and writing of the printing log information and printing data is actually executed via the storage control unit 204 inside the control unit 203.

Next, the performance of the information storage apparatus (hard disk drive apparatus (HDD)) 205 will be explained.

In the information storage apparatus 205, the performance of reading and writing the data is executed by the rotating recording medium (hard disk medium) 301 located near the magnetic head 302H of the swing arm 302-1 of the pickup unit (optical pickup) 302. The pickup unit 302 must be held at a prescribed position near the rotating recording medium 301 to accurately write the data onto the recording medium (hard disk medium) 301.

In a worst-case scenario where the information storage apparatus 205 is in an environment that causes vibrations and shocks, the pickup unit 302 collides with the recording medium 301, thereby scarring the surface of the recording medium 301.

In addition, the pickup unit 302 cannot be held at the prescribed location, causing a reading error because the data at a prescribed location cannot be read or causing a writing error because the data cannot be written at a prescribed location.

In addition, the information storage apparatus (hard disk drive apparatus (HDD)) 205 has a write cache memory function as the objective of an overall upgrade. The cache memory function is used with the objective to eliminate the difference, in the information storage apparatus 205, between the access speed for internally accessing the rotating recording medium 301 and the communication speed of an external bus communicating with external equipment.

The storage control unit 204 is used as a host that issues a command to the information storage apparatus 205. At this time, the data received along with the write command is temporarily stored in a semiconductor memory (cache memory) formed in the information storage apparatus 205. Even where the process of writing onto the rotating recording medium 301 is not finished, a write completion report is sent to the host storage control unit 204 at the time where writing onto the semiconductor memory (cache memory) is completed and, after this, an upgrade is attempted to by writing the data on the rotating recording medium 301.

The write cache memory function, through normal access, is effective for upgrading but, because the host storage control unit 204 has already received the write completion report, even where writing onto the rotating recording medium 301 is actually in progress (not finished) it cannot be detected that the writing is in progress.

A standby command demanding removal of the pickup unit 302 from the host storage control unit 204 is issued as a safe means of removing the pickup unit 302 even during the write performance of the recording medium 301. Upon receiving the standby command at a time where writing data remains in the write cache memory, the recording medium 301 shows that the writing performance is in progress by using a busy signal until the writing of the data in the cache memory onto the rotating recording medium 301 is finished. After completion of the writing, the pickup unit 302 is removed from the rotating recording medium 301 and the information storage apparatus 205 is moved to a standby mode that is a safe condition. After being moved into the standby mode, the busy signal is deactivated.

FIG. 3 is a schematic diagram of the internal structure of the information storage apparatus (hard disk drive apparatus (HDD)) 205 in standby mode and being accessed by the recording medium (hard disk medium) 301.

During access, the pickup unit 302 is positioned above the rotating recording medium 301 but, during standby mode, the pickup unit 302 is removed to a safe location on the ramp and held in a safe condition where it does not scar the recording medium 301 even if there is a shock.

An operation performed by the user is necessary to remove the errors occurring in the aforementioned image formation process and the performance executed in a case where the operation of the user causes a shock and vibration that inhibit the performance of the information storage apparatus 205 causing a paper jam will be explained as an example.

As described above, the printing paper supplied from the paper tray 101 is smoothly fed to the outside of the apparatus after passing through the paper supply sensor 106 through an unobstructed process.

However, in a case where, for example, the paper becomes stuck for some reason upon entering the fusion device 104, the paper accumulates in the paper travel path 102 without passing through the delivery sensor 107. In this case, the user, after opening the upper cover 105 of FIG. 1, must remove the accumulated paper from the paper feeding path 102 and reclose the upper cover 105 to resolve the paper jam and return the printing apparatus to its original condition. The aim of the present invention is to ensure that the hard disk is in standby mode before the user opens the upper cover 105 because there is a danger that opening and closing of the upper cover 105 may cause a shock and vibration through the entire apparatus.

The following is an explanation of the method for detecting that a paper jam has occurred.

The apparatus error detection unit 202 shown in FIG. 2 detects the signal waveform of the paper supply sensor 106 and the delivery sensor 107 and confirms the progression condition of the paper. In a case of the aforementioned paper jam example, the signal waveform of the paper supply sensor 106, after changing at the time where the paper arrives, returns to its original state after the printing paper passes through, but the signal waveform of the delivery sensor 107, after the signal waveform of the paper supply sensor 106 returns to its original state, does not change even though the necessary time has passed to feed the paper to the paper feeding path 102. The apparatus error detection unit 202 detects an accumulation of paper in the manner described above.

Among the other errors occurring in the printer 201, an operation performed by the user is necessary to correct the error and the following problems that inhibit the performance of the information storage apparatus 205 arise from a shock and vibration caused by the operation of the user.

The printer 201 forms the image on the printing paper while using consumables 103 such as toner and an image drum. Accordingly, the consumables 103 such as toner are consumed according to the number of pages printed at a time where the image forming process is repeatedly executed. For example, the toner is consumed for every printing and the remaining amount therefore decreases. In a case where the remaining amount of the consumables 103 is below a specified amount, the apparatus error detection unit 202, because a large amount of flaws may arise in the printing result, uses a remaining amount detection section, not shown, to detect the remaining amount of consumables 103 such as toner, makes a judgment that a consumables error has occurred in a case where it is detected that the remaining amount I below the specified amount, and notifies the control unit 203. In such a case, the user opens the upper cover 105 to correct a toner exchange error or drum exchange error.

In the same manner, the apparatus error detection unit 202 detects that the printing paper stored in the paper tray 101 has been completely consumed through an empty signal from the remaining paper detection sensor, not shown. The control unit 203 is notified of a paper end error at a time where the empty signal is detected. The user than pulls out the paper tray 101 and replenishes the paper supply.

In addition, in a case where a sensor output section, not shown, disposed in the paper feeding path 102 is detected, the length, width, and thickness of the paper is detected, and a judgment is made that the printer 201 cannot execute the image formation process with this paper at a time where the image formation process is performed and the printing paper is fed into the paper travel path 102, the apparatus error detection unit 202 stops the feed of printing paper and notifies the control unit 203 of a paper aberration error, in the same manner as a paper jam.

FIG. 4 is a flow chart showing the performance of an error display process of the image forming apparatus of the first embodiment of the present invention.

After the information storage unit 205 is set to the safe condition of standby mode at a time where the control unit 203 receives notification of an error described above from the apparatus error detection unit 202, it is necessary to notify the user that an error requiring intervention by the user has occurred. The process for sending not only the error notification, but also management information necessary for the user based on selection information such as data capacity and access condition, to the display unit of the operator panel 206 will be explained.

The control unit 203 begins the error display process upon receiving notification from the apparatus error detection unit 202 that, for example, an error such as a paper jam has occurred (step 401). The status register for storing the selection information is housed in a portion of the storage control unit 204 inside the control unit 203 and the control unit 203 reads the status register and ascertains whether data is currently being read from the information storage apparatus 205 (step 402). If data is currently being read from the information storage apparatus 205, the reading performance is continued until reading command currently in progress is completed (step 403). Because the information recording apparatus 205 previously sends the data read from the rotating hard disk medium 301 to the external bus of the information storage apparatus 205, and because the read data is not stored in the cache memory, the internal portion of the information storage apparatus 205 does not execute the performance to read the data from the rotating recording medium 301 after the storage control unit 204 finishes the reading command in progress. The reading of the data up to the current process is executed using a pointer capable of address designation and the current pointer is preserved.

Next, the control unit 203 executes the process to ascertain whether data is currently being written on the hard disk medium 301 of the information storage apparatus 205, by reading the status register of the storage control unit 204 (step 404). In a case where the information read from the status register is that the writing is in progress, the control unit 203 instructs the storage control unit 204 to stop writing (step 405) and further instructs the storage control unit 204 to begin a process prohibiting new access to the hard disk medium 301 of the information storage apparatus 205 and to issue a standby command to safely remove the pickup unit 302 from the hard disk medium 301 (step 406). The writing is preserved as a pointer in the same manner as the reading.

The hard disk medium 301 of the information storage apparatus 205 receiving the standby command continues the cache writing performance in the manner described above. The storage control unit 204 that is the host of the information storage apparatus 205, after the standby command is issued to the information storage apparatus 205, continues monitoring the information storage apparatus 205 until the busy signal stops (step 407). Stoppage of the busy signal means that writing of the cached data (cache write) is finished and the swing arm 302-1 is removed to the ramp 303.

The control unit 203 is notified of the detection of the stoppage of the busy signal. The control unit 203, upon receiving the information that the busy signal has stopped, makes a judgment that the information storage apparatus 205 has moved to the safe standby mode and instructs the information storage apparatus 205 to execute the error display such as paper jam in the display unit of the operator panel 206.

In the system of the first embodiment of the present invention, the control unit 203 waits until detection of the removal of the error by the apparatus error detection unit 202 (step 409) and, after receiving notification of the removal of the error, clears the error display from the display unit of the operator panel 206 (step 410).

The control unit 203 further stops the process prohibiting new access of the information storage apparatus 205, instructs the storage control unit 204 to issue an idle command to the information storage apparatus 205, and finishes the error display process (step 411).

In the image forming apparatus of the first embodiment, as described above, in a case where an error is detected that requires the intervention of the user, the control unit 203 of the printer 201 first instructs the storage control unit 204 to stop access to the information storage apparatus 205. Further, the error display is executed after confirmation that the information storage apparatus 205 is in a condition safe from shock and vibration, so that the user sees the error message and can set the information storage apparatus 205 to a safe standby condition by moving the pickup unit 302 from the rotating recording medium 301 to the ramp 303 before the user performs operations such as replenishing the toner or removing jammed paper that cause a shock to the apparatus.

Second Embodiment

The following is a detailed explanation using diagrams concerning the best mode for carrying out the second embodiment of the present invention. In the first embodiment, in a case where an error is detected requiring intervention of the user, the recording medium 301 is put in a safe condition and further access is prohibited. After this, there is a problem that, regardless of the printing performance, it is impossible to respond to a request from a host apparatus for the sending of management data such as a printing log. This problem is solved by moving the data to a temporary storage unit 203-1 such as a RAM before removing the pickup unit 302 from the recording medium 301. The following is a description of the flow chart of FIG. 5 describing the second embodiment of the present invention that has different steps than the first embodiment.

FIG. 5 is a flowchart showing the method of the error display process of the image forming apparatus of the second embodiment.

In the error display process of the image forming apparatus of the second embodiment, it is important to focus on the addition of step 506. Step 506 and step 507 of the second embodiment correspond to step 406 of the first embodiment.

In step 506, a process is executed to read the management information from the information storage apparatus 205. Reading of the management data from the recording medium 301 is performed before the standby command is issued to the recording medium 301, and the management data is then moved to the temporary storage unit 203-1 such as a RAM.

The data stored in the recording medium 301 of the printer 201 is roughly divided into two categories, which are printing data to be used for printing and management information such as a printing log that is necessary for answering an inquiry from the host apparatus such as a PC. The printing data is a series of large sized data and, depending on the printing contents, can exceed 100 MB.

The management information such as a printing log, on the other hand, is small sized data created at every printing job performed by the printer 201. At step 506, the control unit 203 reads only the management information such as the printing log from the data stored on the recording medium 301 and writes this management information in the temporary storage unit 203-1 such as the RAM.

At step 506, since from these two categories of data the management information is read from the recording medium 301 and moved to the temporary storage unit 203-1 such as the RAM, a response can be given using the information stored in the RAM to an inquiry from the host apparatus such as the PC concerning the management information, even where the process prohibiting access to the recording medium 301 is in effect.

Next, an explanation is given concerning the method for storing data in the recording medium 301 in the second embodiment of the present invention.

Figure 6A:
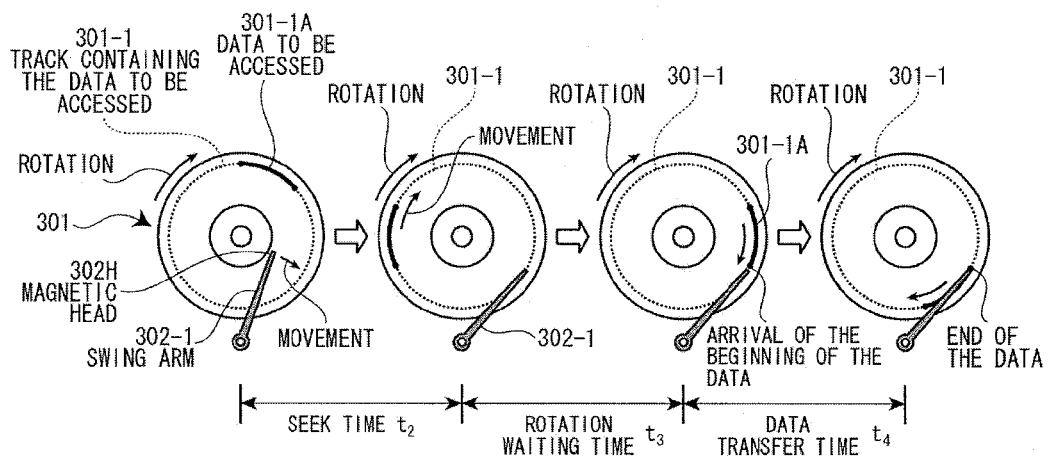
FIG. 6A is an explanatory diagram showing the performance of the information storage apparatus (hard disk drive (HDD))
Figure 6B:
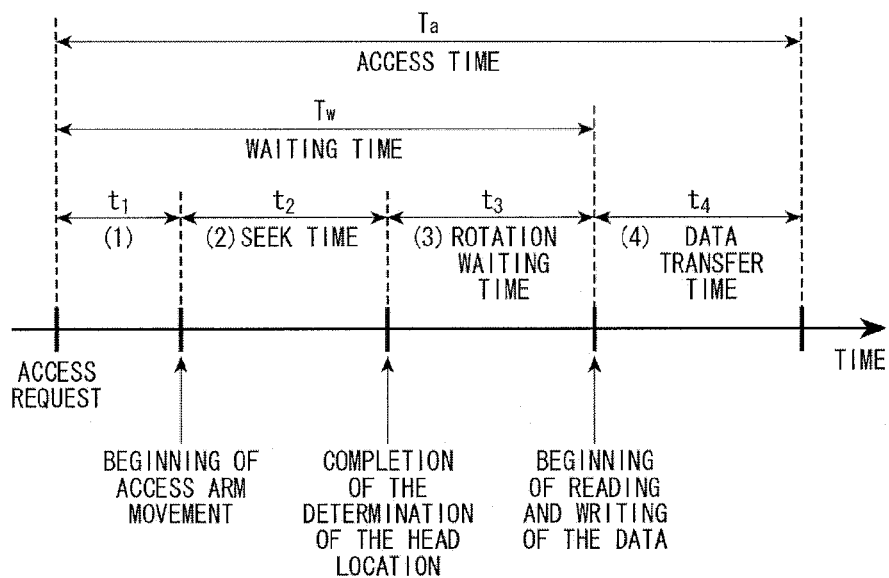
FIG. 6B is a timing chart showing the performance of the information storage apparatus (hard disk drive (HDD))
Figure 6C:
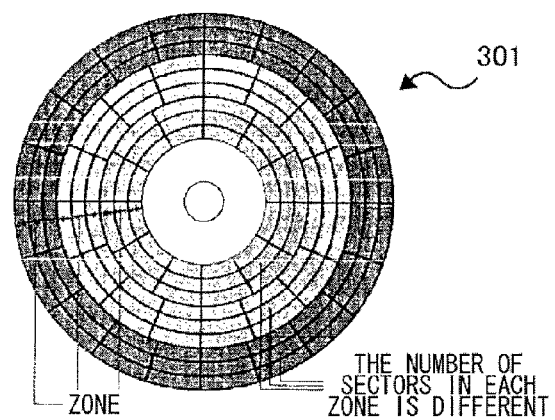
FIG. 6C is a diagram showing the structure of the recording medium of the information storage apparatus (hard disk drive (HDD))

First, the access speed of the recording medium 301 is explained using FIG. 6A through FIG. 6C.

The recording medium 301 reads the data in the following order.

(1) There is a waiting time after the host issues the access request to the information storage apparatus 205 and it is set as the access arm movement initialization waiting time t1.

(2) At the seek time t2, the swing arm 302-1 of the pickup unit 302 is moved and stopped above the concentric track storing the target data.

(3) The rotation waiting time t3, is the time spent waiting for the beginning of the target data to rotate and arrive at the tip of the swing arm 302-1 of the pickup unit.

(4) At the data transfer time t4, the target data is read until the end as it rotates.

Accordingly, the access time Ta is the combined time of the total waiting time of (1)~(3) Tw and the data transfer time t4.

In the hard disk medium of the recording medium 301, the aforementioned tracks are circular and arranged concentrically. Each track is made from multiple sectors that are divided units that can store a fixed amount. The recording medium 301, because it is a unit having uniform recording density, the area further from the center has a greater circumference and therefore has a larger number of selectors. Since changing the number of selectors for each track is very troublesome from a management perspective, neighboring tracks are usually grouped into a zone and a formula is adopted for setting the number of tracks in each zone.

In the second embodiment, taking the difference of the number of selectors in a track and the reading time into consideration, two separate zones, an external zone and an internal zone, are managed and two types of data stored by the printer 201 are divided and respectively stored in the two zones.

In other words, the printing data that is a series of large sized data is stored in the external zone and the management information that is small sized data is stored in the internal zone.

In a case where 10 MB of printing data is stored in both the internal and external zones, there is a large difference in the access time, as shown below.

Data size: 10 MB
Number of sectors: external=20 sectors/track, internal=10 sectors/track
Average wait time: 4 ms
Necessary number of tracks in the external case:

$$(10 \times 1000 \div 20 \times 0.5) = 1000 \text{ tracks}$$

Access time:

$$1000 \times 4 \text{ ms} + (1000 \div 5400) \times 60 = 15.1 \text{ seconds}$$

Necessary number of tracks in the internal case:

$$(10 \times 1000 \div 10 \times 0.5) = 2000 \text{ tracks}$$

Access time:

$$2000 \times 4 \text{ ms} + (1000 \div 5400) \times 60 = 30.2 \text{ seconds}$$

On the other hand, since the area of one track is enough to store one piece of the management information because of its small size, there is no difference in the access time because a thousand tracks are necessary to store a thousand pieces of information in either the external or internal zones.

Figure 7:
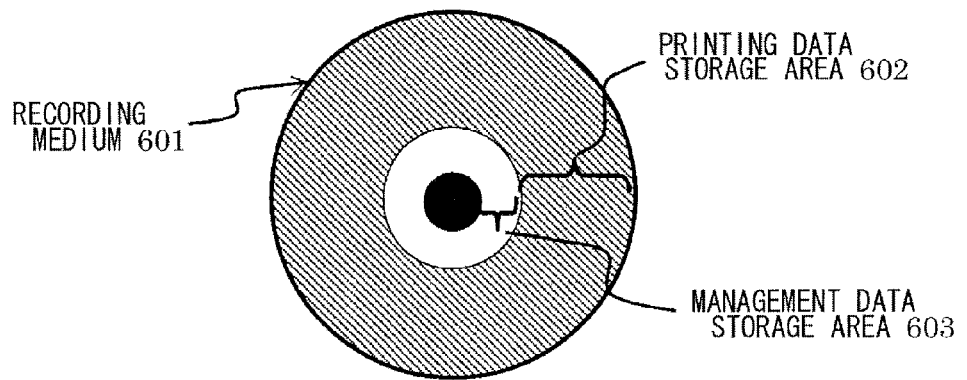
FIG. 7 is a diagram showing the construction of the recording medium inside the information storage apparatus (hard disk drive (HDD)).

As shown in FIG. 7, a printing data storage area 602 is used as the external zone and a management data storage area 603 is used as the internal zone so that, in a case where the image forming apparatus of the present invention is applied to a printer (printing apparatus), the printer can quickly read and write the printing data and can also read the management information by reading only the management data storage area 603 of the internal zone.

In the second embodiment, as described above, in a case where an error is detected that requires the intervention of the user, the control unit 203 of the image forming apparatus instructs the storage control unit 204 to read the data that may be requested by a host apparatus and the data such as the printing log and printing information stored in the recording medium 301 that is unnecessary at the time of printing. After the data that may be requested is moved and stored in the temporary storage unit 203-1 such as the RAM, access to the information storage apparatus 205 is stopped and the error display is executed after confirmation that information storage apparatus 205 is in a condition safe from shock and vibration. Therefore, the pickup unit 302 reading the information from the rotating recording medium 301 is moved to the ramp 303 and held safely away from the recording medium 301. An inquiry from the host apparatus can be answered from the data that was moved to the temporary storage unit 203-1 such as the RAM.

The image forming apparatus of the first and second embodiment of the present invention is explained in a case where it is applicable to a printing apparatus (printer) but is not limited to a printer and can effectively use information stored in the recording medium inside the information storage apparatus of an image forming apparatus containing an information storage apparatus that is a hard disk drive (HDD) apparatus in an MFP, fax machine, or photocopier.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus, comprising:
    an apparatus error detection unit for detecting occurrence and removal of an error requiring intervention of a user;
    an information storage unit for bringing a pickup unit near a rotating recording medium to record and reproduce data;
    a first control unit for stopping access to the information storage unit from a time where the error is detected by the apparatus error detection unit to a time where removal of the error is detected, wherein the first control unit, in a case where the error is detected by the apparatus error detection unit, moves the pickup unit of the information storage unit away from the rotating recording medium and notifies the user of the error only after the pickup unit has been moved away from the rotating recording medium;

a temporary storage unit in which a portion of the data stored in the information storage unit is stored when the error detection unit detects the occurrence of the error and before the pickup unit is moved away from the rotating recording medium, wherein the portion of the data stored in the temporary storage unit is management information;

a second control unit for reading the management information from the temporary storage unit in a case where the management information is subject to an inquiry by a host apparatus, and for answering the inquiry from the host apparatus even at a time where access to the information storage unit is stopped, wherein, after the occurrence of the error is detected, the first control unit reads the management information from the rotating recording medium to write the management information in the temporary storage unit, and wherein, after an inquiry is received from the host apparatus, the second control unit reads the management information corresponding to the inquiry from the management information written in the temporary storage unit to send the corresponding management information to the host apparatus.

2. The image forming apparatus according to claim 1, wherein the error is at least one of a printing medium feeding error, a printing medium completion error, an internal consumable item error, and a printing medium classification error.

3. The image forming apparatus according to claim 1, further comprising a third control unit for classifying the data stored in the information storage unit based on selection information of access condition and data size, for selectively storing the data in different areas of the information storage unit.

4. The image forming apparatus according to claim 3, wherein data stored in the information storage unit contain a large size of printing data and a small size of management information.

5. The image forming apparatus according to claim 4, wherein the information storage unit is a circular recording medium and stores the large size of printing data in the external area and stores the small size of management data in an internal area of the information storage unit.

6. The image forming apparatus according to claim 1, wherein the temporary storage unit is random access memory, and wherein the image forming apparatus further comprises an error display processing unit for executing a process to notify the user of occurrence and removal of an error, based on selection information and error information.

7. The image forming apparatus according to claim 1, wherein the recording medium is a hard disk medium having a prescribed storage capacity, wherein the information storage unit is a hard disk drive apparatus containing the hard disk medium, and wherein the hard disk drive apparatus houses a cache memory as the temporary storage unit to increase speed.

8. The image forming apparatus according to claim 1, wherein the intervention of the user is an operation for opening and closing a cover or an operation for inserting and removing the medium cassette.

9. The image forming apparatus according to claim 1, wherein the apparatus includes a holding unit for holding the pickup unit when access is stopped to the information storage unit.

10. The image forming apparatus according to claim 1, wherein the management information is printing log information.

* * * * *